United States Patent [19]

Replin

[11] 4,231,408
[45] Nov. 4, 1980

[54] TIRE STRUCTURE

[76] Inventor: Henry Replin, 110 S. Dexter St., Denver, Colo. 80222

[21] Appl. No.: 913,975

[22] Filed: Jun. 8, 1978

[51] Int. Cl.³ .............................................. B60C 9/00
[52] U.S. Cl. .................................... 152/353 R; 152/5; 152/354 R
[58] Field of Search .......................... 152/353 R–359, 152/5, 155, 246–250; 156/136, 422

[56] References Cited

U.S. PATENT DOCUMENTS

| | | | |
|---|---|---|---|
| 1,077,128 | 10/1913 | Doughty | 152/353 R X |
| 1,209,645 | 12/1916 | Price | 152/357 R X |
| 1,930,764 | 10/1933 | Mallory | 152/354 |
| 2,906,314 | 9/1959 | Trevaskis | 152/356 |
| 3,480,065 | 11/1969 | Verdier | 152/353 R |
| 3,982,576 | 9/1976 | Replin | 152/356 X |
| 4,120,338 | 10/1978 | Mirtain | 152/354 R X |
| 4,121,641 | 10/1978 | Nakasaki | 152/354 R |

Primary Examiner—John J. Love
Attorney, Agent, or Firm—Ralph H. Dougherty

[57] ABSTRACT

A tire structure which augments a conventional tire structure by including therein a load transferring configuration in each sidewall from the bead to the tread. The beads of each sidewall are contacted tangentially by a plurality of elongated connecting members and the sidewall area between the bead and the connecting members is reinforced.

17 Claims, 10 Drawing Figures 4,231,408

TIRE STRUCTURE

BACKGROUND OF THE INVENTION

This invention relates generally to an improved tire structure as well as to a method of improving the transmission of power through tires to a supporting surface. More particularly, the invention relates to the transmission of torque from the bead to the tread of a tire to provide a plurality of favorable force couples within the sidewall of the tire to transmit torque through the sidewall of the tire.

Tire structures and materials for constructing tires are discussed thoroughly in my earlier U.S. Pat. No. 3,982,576. In that patent, a plurality of elongated connecting members either comprise a portion of the bead or are connected to the bead through at least 180 degrees of the bead. I have now discovered that torque can be transmitted advantageously through a sidewall wherein elongated connecting members are connected tangentially to the bead and a certain surface area of the sidewall defined by the bead and tangents thereto is reinforced, which also achieves certain other desirable properties.

SUMMARY OF THE INVENTION

The present invention includes in addition to conventional tire structure a plurality of wires or cords positioned in each sidewall and when viewed in a side view appear to be tangential to the tire bead. The region between the cords is reinforced to stiffen selected areas of the sidewall.

OBJECTS OF THE INVENTION

It is the principal object of this invention to provide an improved tire structure for transmitting torque through the sidewall of a tire in a particularly advantageous manner.

It is also an object of this invention to provide an improved method for transmitting torque through the sidewall of the tire.

Additional object of this invention is to provide a structure which reduces the breaking distance of a vehicle.

Still another object of this invention is to provide a tire which will tend not to skid sideways when mounted on a vehicle.

It is also an object of this invention to provide a means for incorporating a suitable structure for improving transmission of torque in a tire during the retreading thereof.

These and other objects of the invention will be more readily apparent from the following detailed description and the accompanying drawings which illustrate various preferred and alternative embodiments of the invention.

DETAILED DESCRIPTION OF THE DRAWINGS

Figure 1:
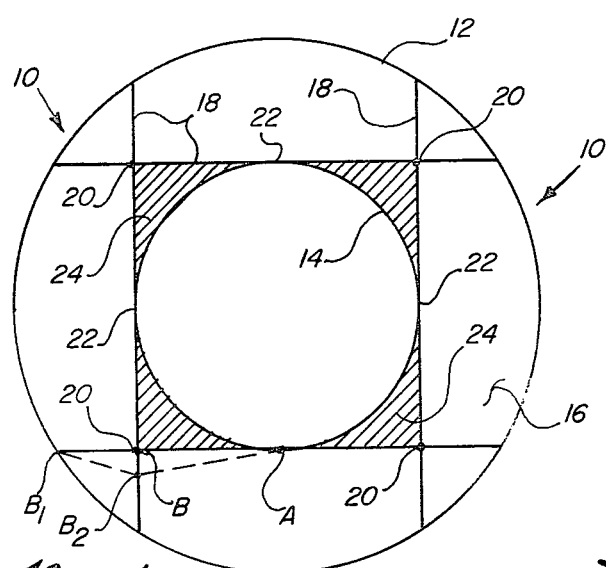
FIG. 1 is a simplified schematic side view of one embodiment of the present invention in the sidewall of a tire.

Referring now to the drawings and particularly FIG. 1, a tire 10 includes an outer annular member or tread 12, an inner annular member or bead 14, a sidewall 16 extending between the bead and the tread and carrying therein a plurality of elongated connecting members 18. The connecting members 18 are connected to each other at points 20 and to bead 14 at points 22. Region 24 of the sidewall is reinforced to give it stiffness. If the tire is mounted on a vehicle, the weight of the vehicle constitutes a load, the force of which is directed downwardly at point A. Because of the stiffening effects of the connected members 18 and the reinforced region 24, the bead tends to act as a square rather than a circle on loading. Point B tends to drop with point A to point $B_2$, creating tension in segment $B_2$-$B_1$. That is, the corners of the square defined by the connecting members drop substantially the same distance as the mid-point. A large portion of the weight is sensed by the corners of the square thus setting up a force couple downwardly through B and upwardly through a corresponding point 180 degrees around the tire. This sets up two non-concentric points, each of which rotate about an instantaneous center. The bead and the tread are no longer concentric as the tread flattens into a "footprint" where it contacts the ground. Thus energy and particularly torque can be transferred from the bead to the tread more advantageously than in tires of standard construction wherein the entire sidewall is utilized to transfer torque to the tread.

In the present invention, the axle tries to rotate about the point $B_1$ but the axle resists lifting because of the load on it, so the wheel and tire are pushed forward. As the tire rotates, the amplified force through point B or $B_2$ diminishes until it passes directly beneath point A, then the next reinforced area begins to increase the torque transfer. This continues in a pulsatory manner, and can occur in the acceleration, breaking, and steady rpm modes.

Figure 2:
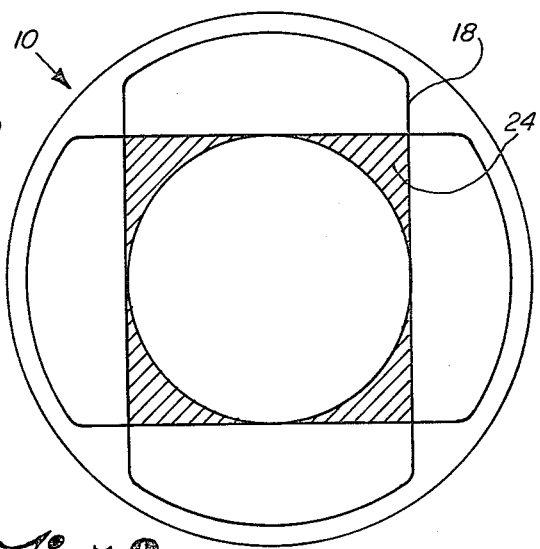
FIG. 2 shows a modification of the FIG. 1 embodiment.
Figure 3:
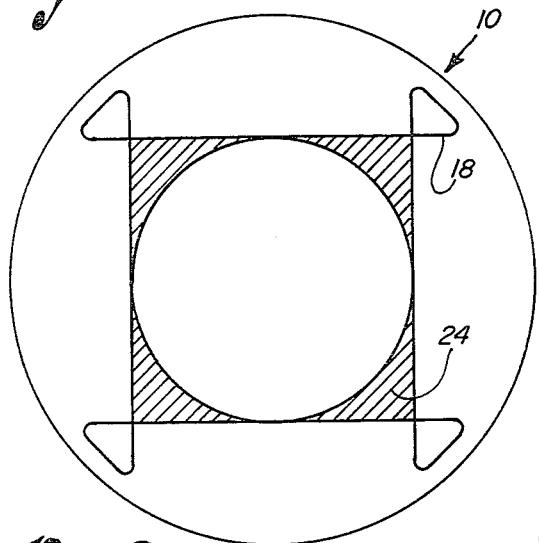
FIG. 3 shows a second modification of the FIG. 1 embodiment.
Figure 7:
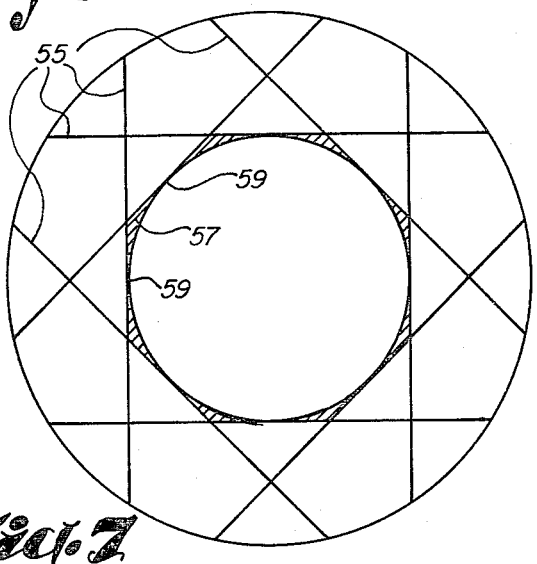
FIG. 7 is a schematic side view similar to FIG. 1 but utilizing a multiplicity of connectors.

The connecting members may pass through the tread area of the tire as shown in FIG. 7 but preferably are connected to one another as shown in FIG. 2 or 3. The embodiment of FIG. 3 allows a single connecting member to be utilized. Connection constitutes merely the overlapping of a few inches of each end of the member and need not require any positive anchor or connector.

Figure 4:
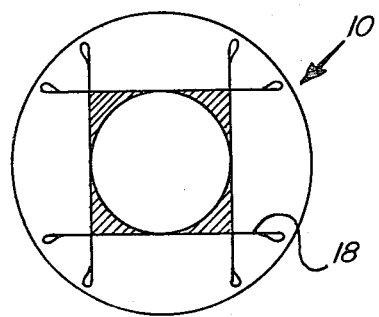
FIG. 4 shows a third modification of the FIG. 1 embodiment

FIG. 4 shows an alternative to FIG. 3 wherein the ends of each connecting member 18 are merely looped back and connected to themselves to prevent the possibility of a wire or cord end from working free and becoming exposed in a tire sidewall.

In order to stiffen the area 24 of the sidewall between the points of tangency 22 and the connecting member 18, area 24 is built up with additional rubber, or it may be reinforced with a compatible mesh such as bronze coated wire or nylon mesh. Any mesh material that will bond to rubber may be utilized such as rayon, nylon, polyester, aramids, fiber glass, steel and bronze-coated steel. Alternatively, the rubber can be harder, that is it would have a higher durometer than the remaining rubber in the sidewall. Of course the simplest method of reinforcing the corner is to add additional rubber merely increasing its thickness. The reinforced corners cause the bead and the reinforced area to act in compression against the elongated connecting members. This sets up a force couple in tension in the leading side creating pulsative increased torque transfer to the tread.

Figure 5:
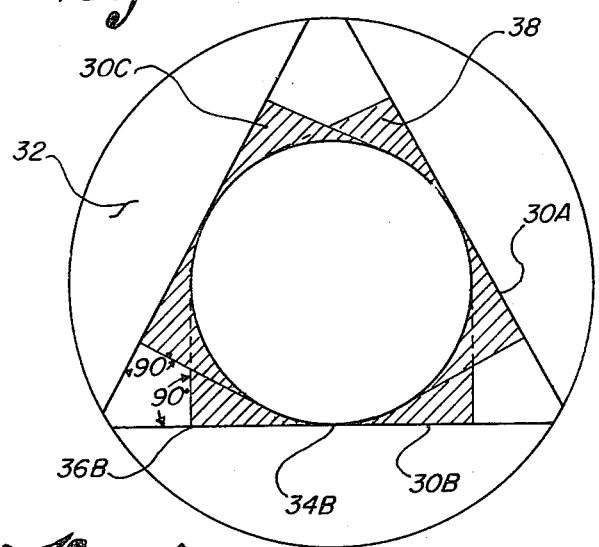
FIG. 5 shows a schematic side view of the tire utilizing a generally triangular connector configuration.
Figure 6:
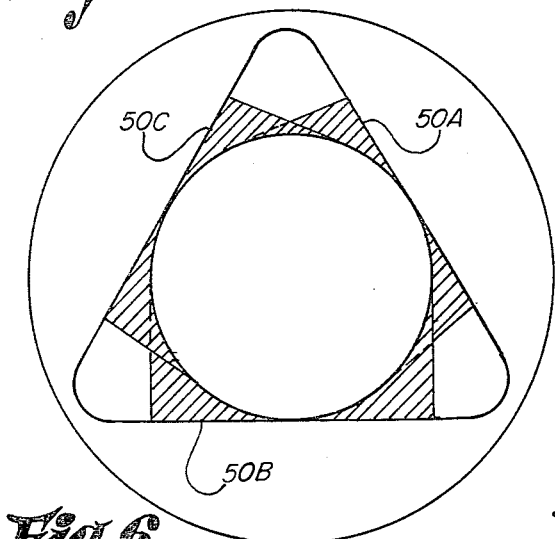
FIG. 6 shows a modification of the embodiment of FIG. 4

FIG. 5 shows a preferred embodiment wherein three elongated connecting members 30A, 30B, and 30C are employed in each sidewall 32. The reinforced area is that area between the point of tangency of the particular connecting member, i.e. point 34B, and the line of tangency normal to the selected connecting member, i.e. at point 36B. This results in a reinforced area 38 of symmetrical configuration having four straight sides and one arcuate side, for which there is no geometric name. FIG. 6 shows an alternative embodiment to that of FIG. 5 wherein the ends of each segment 50A, 50B and 50C of a connecting member are connected to each other connecting member in that sidewall.

Figure 8:
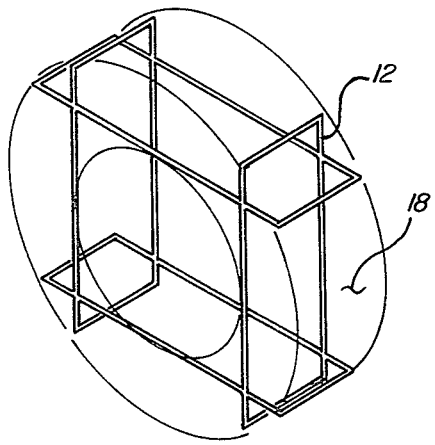
FIG. 8 is a simplified perspective view of the construction shown in FIG. 1.
Figure 9:
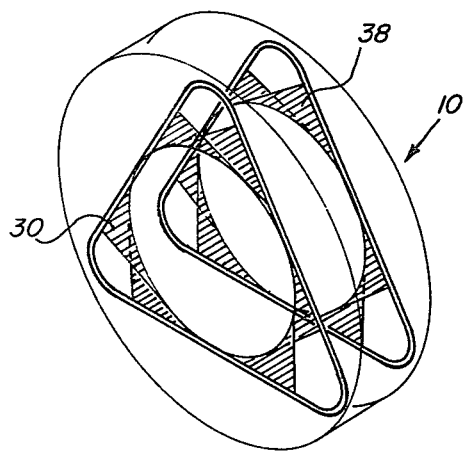
FIG. 9 is a simplified perspective view of the construction shown in FIG. 5.

FIG. 7 shows a plurality of connecting members 55, eight are shown, with only a small area of reinforcing 57 between adjacent connecting members 55 and their points of tangency 59. In theory, a large plurality of connecting members could be employed but this would necessarily reduce the reinforced area and thus reduce the effectiveness of the torque transmission through the sidewall. From three to eight connecting members in each sidewall are preferred but the optimum number of connecting members in each sidewall is three or four as shown in FIGS. 8 and 9.

Figure 10:
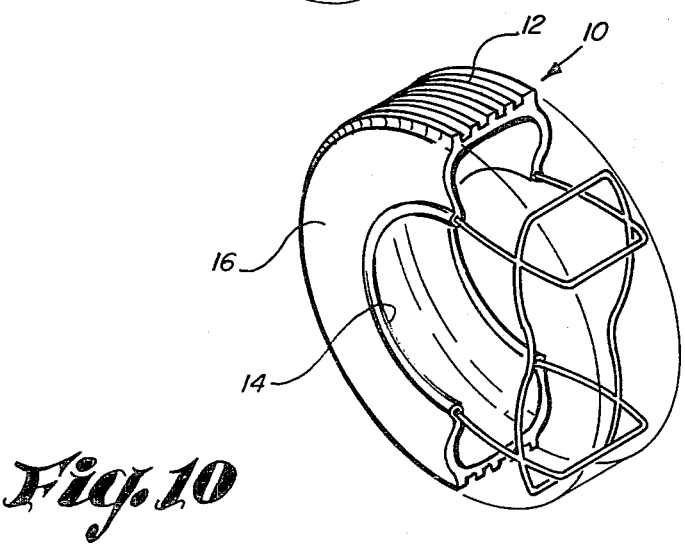
FIG. 10 is a partially cut-away perspective view of a tire according to the present invention.

While the elongated connecting members shown in FIGS. 1 through 7 are represented as straight lines, it will of course be understood that in fact such elongated connecting members conform to the curvature of the sidewall 16 of tire 10 as shown in FIG. 10.

Of particular advantage in this invention is that the elongated connecting members need not be insulated from the rubber in the sidewall as was required in my earlier patent.

This invention is particularly well suited to retreaded tires and readily adaptable for emplacement in tires during the retreading operation. Referring to FIGS. 2, 3, 4, and 6 the connecting members 18 would be preconnected into a unit as in wire reinforced rubber tape. Additional rubber in the region of reinforcing 24 would be placed into the retreading mold along with the reinforced tape against each sidewall of the tire. These external connecting members and reinforcing areas would be vulcanized to the tire wall during the retreading process.

Suitable materials for the elongated connecting members are those which are compatible with tire manufacture and rubber treatment such as rayon, nylon, polyester, aramids, fiber glass, steel, bronze coated steel, or the like.

The strength required of these connecting members is determined by the vehicle weight plus the force to be exerted on an axle plus a safety factor for thrust loading. It is probable that the force to be withstood by these connecting members should be a minimum of 1,000 to 1,200 pounds and for automotive tires must be an absolute minimum of 500 pounds. The connecting members must be flexible but have finite length, that is, must not be subject to excessive stretch.

The pattern of the connecting members and reinforcement must be nearly a mirror image on opposing sidewalls, within good tire manufacturing procedures.

It is anticipated that other changes and modifications may be made without departing from the scope of the invention as defined by the appended claims.

What is claimed is:

1. A pneumatic tire structure comprising:
    a tread;
    a pair of opposing sidewalls extending from said tread and defining an inner annular opening;
    an inner annular member carried by each sidewall;
    from three to eight elongated wire or cord members arranged symmetrically around and tangential to each said inner annular member; and
    mesh material reinforcing in said sidewall only in the area between each point of tangency, the inner annular member and the adjacent elongated wire or cord member.

2. Structure according to claim 1 wherein said mesh is embedded in said sidewall.

3. Structure according to claim 1 wherein said mesh material is selected from the group consisting of rayon, nylon, polyester, aramids, fiber glass, steel and bronze-coated steel.

4. A structure according to claim 1 wherein said wire or cord members are embedded in each sidewall.

5. A pneumatic tire structure comprising:
    a tread;
    a pair of opposing sidewalls extending from said tread and defining an inner annular opening;
    an inner annular member carried by each sidewall;
    from three to eight elongated wire or cord members arranged symmetrically around and tangential to each said inner annular member; and
    reinforcing comprising a built-up area of additional rubber on said sidewall limited to and completely filling the area between each point of tangency, the inner annular member and the adjacent elongated wire or cord member.

6. A structure according to claim 5 wherein each elongated member in each sidewall passes through the tread area and is connected to its respective elongated member in the opposite sidewall.

7. A structure according to claim 5 wherein the end of each elongated member is connected to an end of a second elongated member in the same sidewall.

8. A structure according to claim 5 wherein the end of each elongated member is connected to itself.

9. A pneumatic tire structure comprising:
    a tread;
    a pair of opposing sidewalls extending from said tread and defining an inner annular opening;
    an inner annular member carried by each sidewall;
    from three to eight elongated wire or cord members arranged symmetrically around and tangential to each said inner annular member; and
    reinforcing comprising an integral sidewall rubber composition of higher durometer than the surrounding sidewall rubber, said reinforcing being limited to and completely filling the triangular area between each point of tangency, the inner annular member and the adjacent elongated connecting member.

10. A structure according to claim 9 wherein each elongated member in each sidewall passes through the tread area and is connected to its respective elongated member in the opposite sidewall.

11. A structure according to claim 9 wherein the end of each elongated member is connected to an end of a second elongated member in the same sidewall.

12. A structure according to claim 9 wherein the end of each elongated member is connected to itself.

13. A pneumatic tire structure comprising:
 a tread;
 a pair of opposing sidewalls extending from said tread and defining an inner annular opening;
 an inner annular member carried by each sidewall;
 three elongated wire or cord members arranged symmetrically around and tangential to each said inner annular member; and
 reinforcing in said sidewall only in the area between each point of tangency, the inner annular member and the adjacent elongated connecting member, and lines normal to each elongated member and tangent to said inner annular member.

14. A structure according to claim 13 wherein each elongated wire or cord member is connected at its extremity to the adjacent elongated wire or cord member in the same sidewall.

15. A structure according to claim 13 wherein each elongated member in each sidewall passes through the tread area and is connected to its respective elongated member in the opposite sidewall.

16. A pneumatic tire structure comprising:
 a tread;
 a pair of opposing sidewalls extending from said tread and defining an inner annular opening;
 an inner annular member carried by each sidewall;
 from three to eight elongated wire or cord members external to said sidewalls, and arranged symmetrically around and tangential to each said inner annular member; and
 reinforcing in said sidewall only in the area between each point of tangency, the inner annular member and the adjacent elongated connecting member.

17. A method of adapting a cured tire for improved transmission of torque comprising:
 affixing from three to eight wire reinforced rubber tapes symmetrically around and tangential to the annular bead of each sidewall of said tire, and reinforcing each sidewall between each point of tangency and the adjacent reinforced tape by application of unvulcanized rubber and curing the unvulcanized rubber and the tapes to bond the reinforcing and the tapes to each sidewall.

* * * * *